(12) United States Patent
Hutchison

(10) Patent No.: US 7,856,550 B2
(45) Date of Patent: Dec. 21, 2010

(54) SYSTEM AND METHOD FOR HARDWARE MANIPULATION IN A COMPUTING DEVICE

(75) Inventor: Perry Hutchison, Tigard, OR (US)

(73) Assignee: Wind River Systems, Inc., Alameda, CA (US)

( * ) Notice: Subject to any disclaimer, the term of this patent is extended or adjusted under 35 U.S.C. 154(b) by 930 days.

(21) Appl. No.: 11/693,042

(22) Filed: Mar. 29, 2007

(65) Prior Publication Data

US 2008/0244280 A1 Oct. 2, 2008

(51) Int. Cl.
*G06F 9/00* (2006.01)
(52) U.S. Cl. .............................. 713/1; 713/2
(58) Field of Classification Search ...... 713/1, 713/2
See application file for complete search history.

(56) References Cited

U.S. PATENT DOCUMENTS

| | | | |
|---|---|---|---|
| 7,188,339 B2 * | 3/2007 | Qureshi | 717/140 |
| 2002/0133487 A1 * | 9/2002 | Oshins et al. | 707/5 |
| 2004/0216137 A1 * | 10/2004 | Warwick et al. | 719/318 |
| 2004/0243534 A1 * | 12/2004 | Culter et al. | 707/1 |
| 2005/0283755 A1 * | 12/2005 | Culter | 717/106 |
| 2008/0148033 A1 * | 6/2008 | Sumner et al. | 713/1 |

\* cited by examiner

*Primary Examiner*—Abdelmoniem Elamin
(74) *Attorney, Agent, or Firm*—Fay Kaplun & Marcin, LLP

(57) ABSTRACT

A device having an operating system including a power control policy for a component of the device and an effector program controlling power for the component based on the power control policy and power control hardware controlled by the effector program to implement the power control policy for the component. A method for determining a power state for a component, executing an effector program to produce a control output corresponding to the power state and controlling power supplied to the component so that the component enters the power state.

18 Claims, 3 Drawing Sheets

SYSTEM AND METHOD FOR HARDWARE MANIPULATION IN A COMPUTING DEVICE

BACKGROUND

Computing devices, such as personal computers, servers, mainframes, etc., often utilize hardware manipulation to optimize performance. For instance, a major area of optimization is power consumption; modern computing devices may reduce power consumption when power is not needed, such as when a hardware component of a device is idle or not being fully utilized. A particular component may be turned off or placed in a low-power state until the component is needed. In computing devices, this manipulation of the component may be performed using hardware, software, or a combination thereof.

One conventional method of hardware manipulation is the Advanced Configuration and Power Interface ("ACPI") specification, which specifies interfaces through which hardware may be recognized, configured and managed. As would be known to those skilled in the art, ACPI enables an operating system ("OS") of a computing device to manipulate the hardware directly—a function which, under the preceding Advanced Power Management ("APM") specification, was relegated entirely to a Basic Input/Output System ("BIOS") of the computing device. As a result, the OS can perform complex manipulations needed to optimize the hardware. In addition, ACPI enables the OS to automatically adjust to different hardware configurations. ACPI also provides a layer of abstraction—the "ACPI Machine Language" or "AML"—that allows the OS to manipulate hardware without the use of unique driver programs. This makes the OS compatible with computing devices that include varying hardware configurations and allows the OS to be developed independently of the hardware and vice-versa. A device which complies with the ACPI specification provides a set of "ACPI tables," which contain "control methods" expressed in AML. In order to process these control methods, the OS conventionally incorporates an "AML interpreter."

In spite of its advantages over the APM standard, ACPI does have certain limitations. One prominent example is the amount of resources required to operate the AML interpreter. In general, an OS must be able to run on any of a large variety of computing devices, which are not all of a single configuration. Because it must describe such a broad variety of hardware, AML is a very generic language and its interpreter is a large and complex program, requiring a substantial amount of memory to execute. The required memory is often obtained at the expense of runtime memory that could have otherwise been utilized for other programs. Thus, executing the AML interpreter can impede device performance.

SUMMARY OF THE INVENTION

A device having an operating system including a power control policy for a component of the device and an effector program controlling power for the component based on the power control policy and power control hardware controlled by the effector program to implement the power control policy for the component.

A method for determining a power state for a component, executing an effector program to produce a control output corresponding to the power state and controlling power supplied to the component so that the component enters the power state.

A device having a memory storing a set of instructions, a processor configured to execute the instructions, the instructions being operable to determine a power state for a component and produce a control output corresponding to the power state. The device further including power control hardware receiving the control output and controlling power supplied to the component so that the component enters the power state.

DETAILED DESCRIPTION

Figure 1:
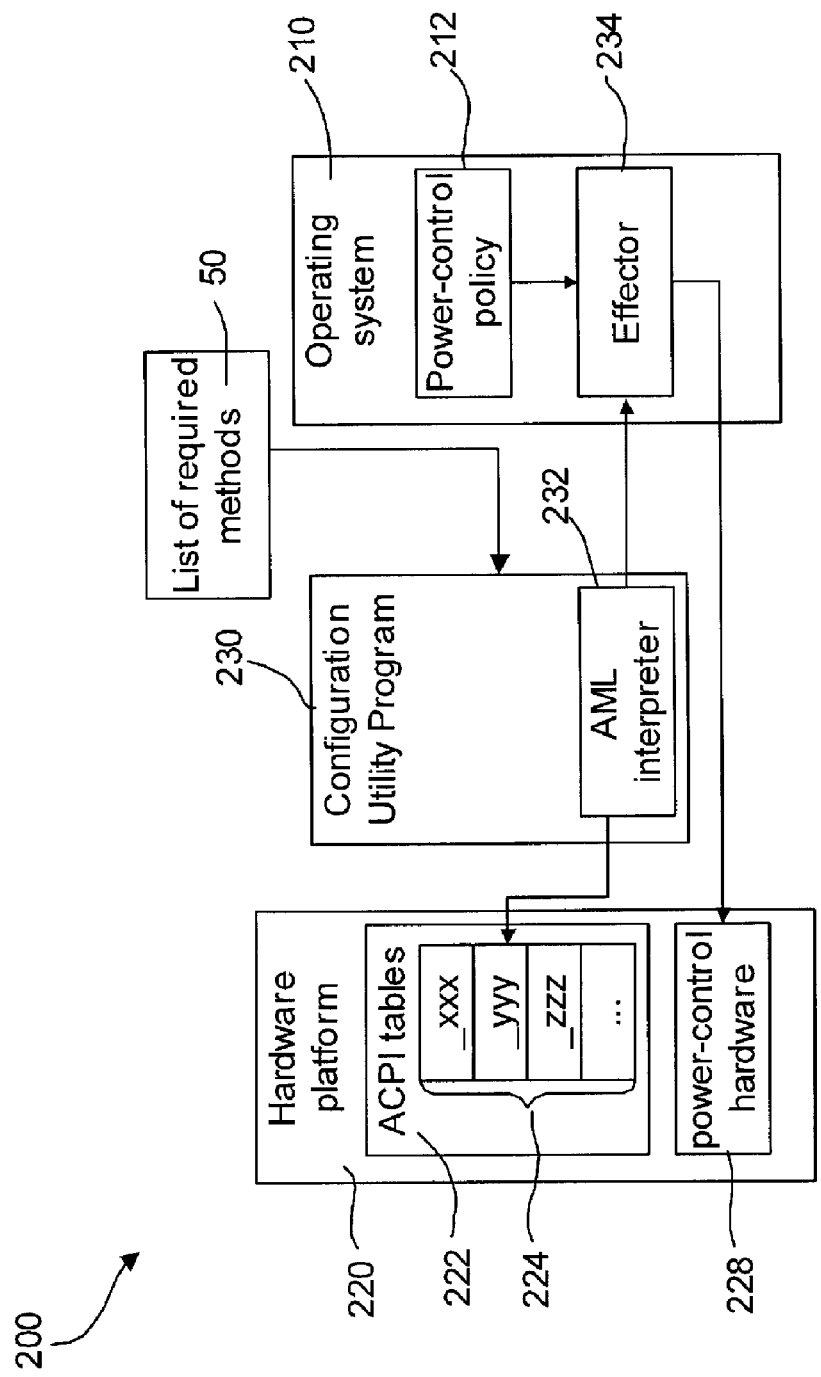
FIG. 1 shows an exemplary embodiment of a computing device according to the present invention.

The present invention may be further understood with reference to the following description and the appended drawings, wherein like elements are referred to with the same reference numerals. The exemplary embodiments of the present invention describe systems and methods for hardware manipulation in computing systems. The exemplary embodiments are described with reference to computing devices that utilize the ACPI specification. However, those of skill in the art will understand that the present invention may be successfully implemented in any computing system that utilizes a generalized hardware manipulation language and program for interpreting and executing a set of hardware manipulating operations.

As will be discussed in detail below, the exemplary embodiments of the present invention reduce a runtime memory requirement. This is advantageous in any computing system in which memory resources are limited. In particular, the present invention is especially beneficial when implemented in an embedded computer system (where memory may only be a few hundred kilobytes) or any fixed configuration system in which a size of an available memory cannot be altered. However, even in general-purpose computing systems with a large amount of memory (e.g., tens of megabytes), the present invention provides for more efficient memory utilization, which is especially important when running memory-intensive programs or multiple programs simultaneously (i.e., multi-tasking).

FIG. 1 shows an exemplary computing device 200 that includes an OS 210 and a hardware platform 220. The OS 210 may be a general operating system (e.g., Windows, Linux, Unix, etc.) or a proprietary OS customized for a specific application and/or hardware configuration. The OS 210 also includes a power-control policy 212, which may include power management profiles for one or more hardware components of the device 200. A power management profile specifies power modes for a hardware component. For example, the power modes may indicate when the component should be turned on (e.g., a full-power mode), conserve power (e.g., a sleep mode) and turned off (e.g., an offline mode). The OS 210 may allow a user to modify the power management profile(s) by, for example, specifying a length of time the component should remain idle in the full-power mode before entering the sleep mode. As would be understood by one skilled in the art, the power modes may correspond to power states (e.g., _PS0, _PS1, _PS2, etc.) defined by the ACPI specification.

The platform 220 includes one or more ACPI tables 222 and power-control hardware 228. The ACPI tables 222 define interfaces to the components and indicate how the components should be controlled. In accordance with the ACPI specification, the ACPI tables 222 may comprise one or more system description tables. For example, the ACPI tables 222 may include a Root System Description Table ("RSDT") that contains pointers to the memory locations of other system description tables. The other system description tables may include a Differentiated System Description Table ("DSDT"), a Secondary System Description Table ("SSDT") and an Extended Root System Description Table ("XSDT"). These other system description tables contain definition blocks that comprise control methods describing hardware configurations and operations for manipulating the components. The ACPI tables 222 may be provided by a manufacturer of the device 200 (e.g., an original equipment manufacturer ("OEM")). For example, the OEM may, after completing an initial hardware configuration of the device 200, create the ACPI tables 222 by including any control method(s) required for operating, configuration, or otherwise manipulating the components. The ACPI tables 222 are stored (e.g., by the OEM) on a memory of the device 200. This memory may comprise a BIOS that is accessible to the OS during startup and/or normal operations of the device 200.

In an exemplary embodiment, the power-control hardware 228 may comprise one or more centralized circuits. For example, the hardware 228 may be circuitry disposed on a motherboard of the device 200. In other embodiments, the hardware 228 may be dispersed throughout the device 200. That is, the hardware 228 may be located on the components, which may each include power-control hardware specifically designed for the component. The power-control hardware 228 may be coupled to a power source (e.g., a 110/220V power supply, a battery, etc.) of the device 200. Thus, the hardware 228 is capable of regulating the supply of power to the components by providing or restricting access to the power source. Although the hardware 228 is described with reference to the control of power, those skilled in the art will understand that the hardware 228 may also be capable of controlling other aspects of the components' operation. For instance, the hardware 228 may perform thermal regulation by, for example, adjusting a speed (i.e., operating frequency) of a central processing unit or a fan to prevent the components from exceeding a recommended operating temperature.

The system 200 also includes a configuration utility program 230 that is independent of the OS 210. The configuration utility 230 is stored on a memory of device 200 that, according to an exemplary embodiment, is separate from the memory used to store the ACPI tables 222. The configuration utility 230 may, for example, be stored on a hard drive, a bootable disk or on a separate device (e.g., a host for an IDE) that is connected to the embedded device during, for example, development. The configuration utility 230 may be executed at any time. However, the configuration utility 230 is preferably executed prior to engaging in normal operations of the device 200. For instance, the execution may be a one-time setup performed by the OEM or developer and updated as needed by the user. In another embodiment, the configuration utility 230 may be executed automatically during startup, prior to loading of the OS 210. Execution of the configuration utility 230 may be determined in part by a configuration of the device 200. If the device 200 has a fixed (i.e., non-upgradeable) configuration, the configuration utility 230 may only need to be executed as part of a one-time setup or when critical updates are needed. If the device 200 has a modifiable configuration, it may be desirable to execute the configuration utility 230 during each startup. Of course, the user may choose to execute the configuration utility 230 at any time. When the user chooses to execute the configuration utility 230, an alert may be presented to the user, warning of potential consequences associated with modifying settings of the configuration utility program and requesting confirmation from the user before proceeding with the execution. In addition, the configuration utility 230 may present the user with a set of basic options with a low risk of adversely affecting operation of the device 200 along with a set of advanced options that have a higher risk.

As shown in FIG. 1, the configuration utility 230 includes an AML interpreter 232 that receives one or more names of control methods and locates the control method(s) in the ACPI tables 222. However, the AML interpreter 232 differs from prior art AML interpreters in that it is bundled with the configuration utility 230 rather than the OS 210. Thus the configuration utility 230 calls the AML interpreter 232 and performs the passing of the names. The configuration utility 230 includes a list of required control methods 50, which are provided by a designer of the power-control policy 212 (e.g., the OEM, the user, etc.). If the designer is the OEM, the list 50 may be provided at a time of manufacture and stored in a memory such as a ROM. The list 50 may, for example, be included as part of the BIOS. If the designer is the user, the list 50 may be provided at any time and stored in a writable medium such as a hard drive, an erasable memory, etc.

Execution of the AML interpreter 232 may be concurrent with that of the configuration utility 230. However, the AML interpreter 232 need not always be running when the configuration utility 230 is executed. According to an exemplary embodiment, the AML interpreter 232 is not executed during normal operations of the device 200. The AML interpreter 232 can only be executed in conjunction with the configuration utility 230 which, as previously described, can be executed once or on-demand. Thus, the AML interpreter 232 does not normally occupy a runtime memory of the device 200. As would be understood by those skilled in the art, runtime memory comprises a fixed sized memory such as Random Access Memory ("RAM"), that is allocated to currently executing programs. When a program such as the AML interpreter 232 is executed, a portion of the runtime memory is usually reserved for the program to use as storage space for variables and/or data. Devoting runtime memory to the AML interpreter 232 is necessary to enable the AML interpreter 232 to execute properly. However, as explained below, the system 200 does not require the AML intepreter 232 to be running in order to perform the hardware manipulation.

According to an exemplary embodiment, the AML interpreter 232 is able to indirectly interact with the power-control hardware 228 by generating one or more effectors 234, which are programs incorporated into the OS 210. The effectors 234 perform the same operations upon the power-control hardware 228 as would have been performed by a conventional AML interpreter in the course of executing the corresponding control methods 224. For each required control method in the list 50, the AML interpreter 232 may generate a corresponding effector 234. After generation, the effectors 234 are stored (e.g., in a memory, a hard disk, etc.) for later access by the OS 210. A total size of the runtime memory required to execute the effectors 234 is significantly less than that required for the AML interpreter 232. This is because the AML interpreter 232 is inherently required to parse and interpret any and all AML opcodes which could be contained in any methods 224, while the effectors 234 need only contain machine code to directly perform the operations corresponding to those particular methods 224 that are provided by the particular hardware platform 220 and selected by the list 50. Thus, the effectors 234 are more memory-efficient than executing a full-sized interpreter.

Figure 2:
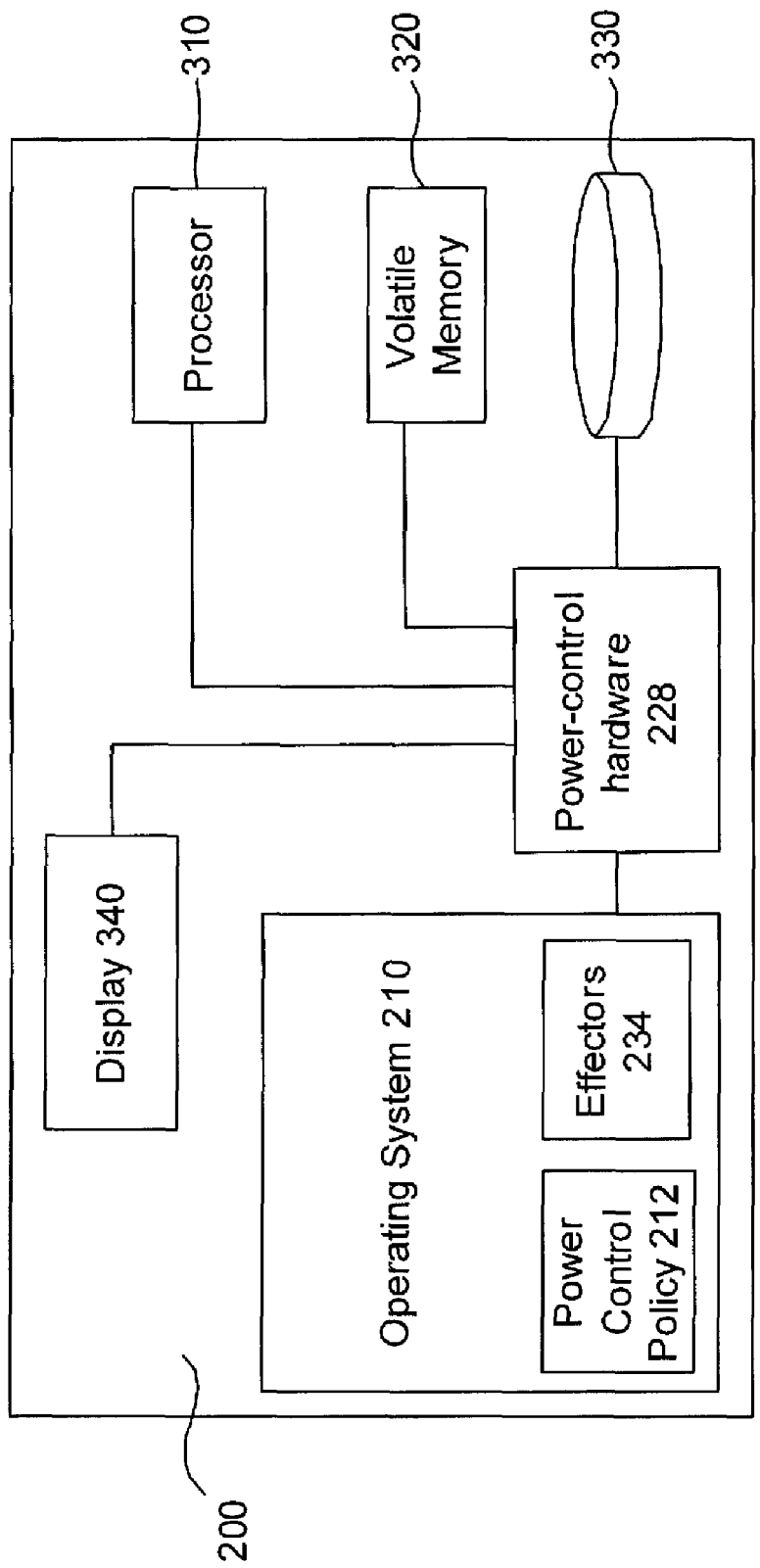
FIG. 2 shows an exemplary embodiment of a device implementing hardware power control according to the present invention.

FIG. 2 shows an exemplary embodiment of an embedded device 200 that includes one or more hardware components that may be internally coupled to (e.g., integral with) the device 200. For example, the device 200 may include a processor 310, a volatile memory 320, a non-volatile memory 330 and an integral display 340. The device 200 also includes the operating system 210 having the power control policy 212 and the set of previously generated effectors 234. As described above the effectors may be generated using the configuration utility program 230 and incorporated into the operating system 210. The device 200 also includes the previously described power control hardware 228.

Those skilled in the art will understand that FIG. 2 is only meant to schematically represent the components of the device 200, e.g., the operating system 210 is a software component that would be executed on the processor 200. In addition, those skilled in the art will understand that the power control hardware 228 is not limited to controlling hardware devices that are integral to the device 200, but may also be used to control external hardware devices connected to the device 200.

The power-control policy 212 initiates execution of the effectors 234 by, for example, using one or more function calls. The effectors 234 may be executed individually or concurrently depending on a state of the device 200 or the components 310-340. For example, the power-control policy 212 may specify one or more ACPI global power states such as a global ON state G0, a global sleep state G1 and a global OFF state G2. The power-control policy 212 may also specify one or more ACPI device power states for each of the components 310-340. The device power states may not be the same from one component to another. For example, the display 340 may have D0, D1 and D2 ON states, and a D3 OFF state, while the volatile memory 320 may only have a D0 ON state and a D3 OFF state. It will be understood that these states are merely exemplary, and other embodiments may include additional or fewer states. These states will now be described in detail below.

The G0 state may be a fully-ON state in which power is provided to each of the components 310-340. The G0 state may be associated with any number of conditions specified by the power-control policy 212. For example, the G0 state may be entered whenever there is non-volatile memory 330 activity.

The G1 state may be a sleeping state in which one or more of the components 310-340 are placed in a partially powered state. For example the G1 state may correspond to providing only enough power to the volatile memory 320 to sufficiently retain the contents thereof, while turning off power to the components 330 and 340. Thus, the corresponding effectors 234 are executed to cause the power control hardware 228 to provide power in accordance with the G1 state. For example, upon transitioning from the G1 state to a waking state (e.g., the G0 state), the contents of the volatile memory 320 are available for reading and/or writing by any programs that may have been running when the G1 state was entered. The G1 state may be entered after an initial period of inactivity (e.g., lack of keystrokes, mouse input, no running programs, etc.).

The G3 state may be a fully-OFF state in which power is turned off for each component 310-340. This state may be equivalent to the user manually shutting off power to the device 200. That is, in the G3 state, the entire device 200 is considered to be in an non-operational state where no (or minimal) power is being consumed. Accordingly, to enter the G3 state, the corresponding effectors 234 are executed to instruct the power control hardware 228 to turn power off to the components 310-340. The G3 state may be entered after a second period of inactivity. The initial period and the second period may be determined by the OEM or specified by the user.

The D0-D3 states will now be described with reference to the display 340 along with conditions for entering the D0-D3 states. However, it will be understood that because the D0-D3 states are local, the global states G0-G3 may preempt the D0-D3 states. Thus, the conditions may not necessarily result in the entering of the D0-D3 states. The D0 state may be a fully-ON state in which full power is supplied to the display 340. Thus, the display 340 will have power to all functions such as display, backlight, etc. As described above, the power control policy 212 determines when (e.g., under what conditions) the display 340 is in the full power D0 state. The power control policy 212 invokes the correct effectors 234 for the D0 state, which, in turn, signals (or controls) the power control hardware 228 to provide the correct level of power to the display 340.

The D1 state may be a partially-ON state such as a sleep state, the D2 state may be an almost off state such as a standby state, while the D3 state may be a fully off state. However, for the purposes of the present invention, the exact power states do not matter. Rather, the present invention is concerned with how the device is placed in any power state. The exemplary embodiments accomplish this using the combination of the power control policy 212, the effectors 234 and the power control hardware 228 without the need for an AML interpreter in runtime memory.

Figure 3:
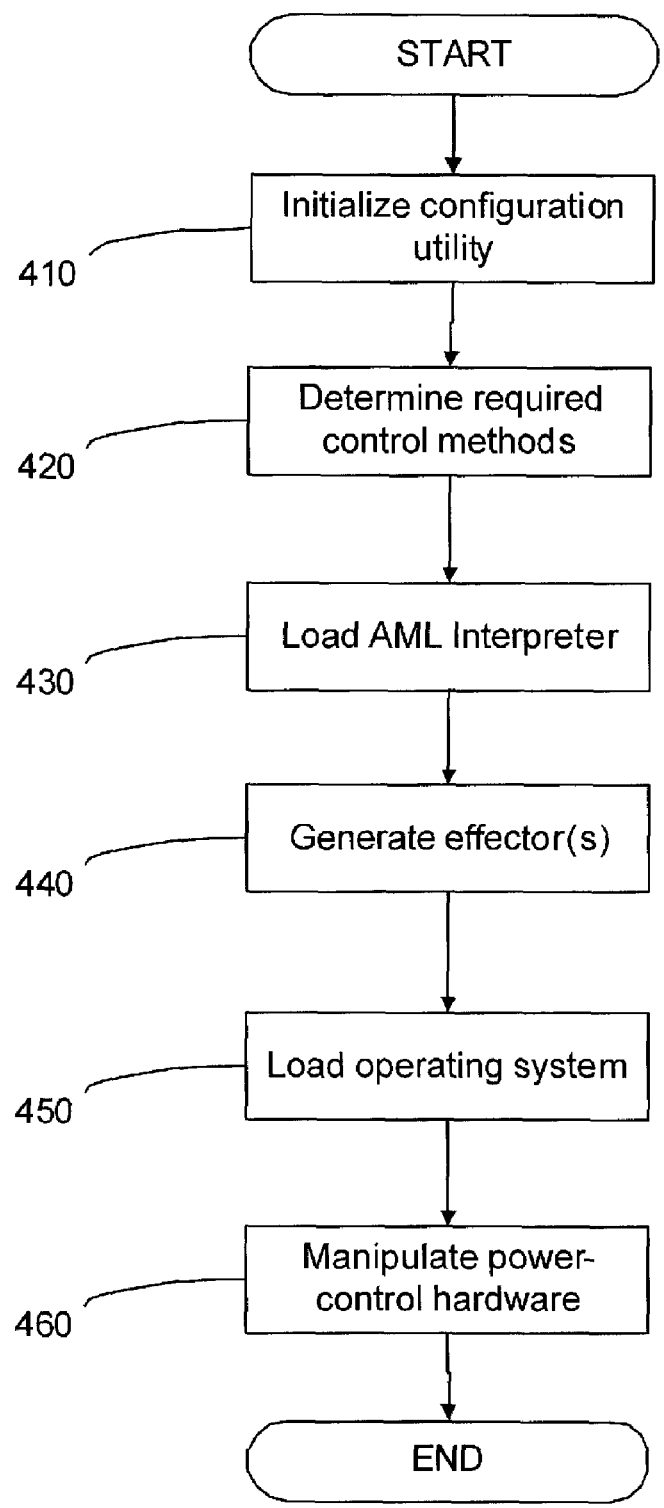
FIG. 3 shows an exemplary embodiment of a method for hardware power control according to the present invention.

FIG. 3 shows an exemplary embodiment of a method 400 for hardware power control. The method 400 may be implemented on the device 200, or any device utilizing the configuration utility 230 as described above. In step 410, the configuration utility 230 is initialized. As discussed above, the configuration utility 230 may be executed at any time. In the exemplary embodiment shown in FIG. 4, the execution occurs prior to loading of the OS 210, such as when the device 200 enters a startup phase.

In step 420, the configuration utility 230 determines the required control methods by accessing the list 50. For example, if the list 50 is stored on the non-volatile memory 330, the configuration utility 230 locates the list 50, which may be stored as one or more files. The list 50 is then parsed and the required control methods are extracted therefrom.

In step 430, the configuration utility 230 loads the AML interpreter 232 by performing a function call and passing the required control methods as parameters. The AML interpreter 232 receives the parameters and for each required control method and generates an effector 234 (step 440). In other embodiments, the AML interpreter 232 may be configured to generate an effector 234 that handles more than one of the required control methods. For example, if two or more of the required control methods perform the same methods upon the same component (e.g., the display 340), a single effector 234 may be generated to handle the two methods.

In step 450, the OS 210 is loaded. Those skilled in the art will understand that a portion of the OS 210 may have already been loaded at a time prior to this step. For example, a kernel of the OS 210 may have been loaded simultaneously with the execution of the configuration utility 230 (e.g., steps 410-440). In any case, the OS 210 is now fully initialized by loading all required programs, processes, drivers, etc. Furthermore, the power-management policy 212 is activated and begins to monitor the device 200.

In step 460, the power-management policy 212 has determined a component should be manipulated and calls one or more effectors 234 to perform the necessary operations. For example, if the power-management policy 212 determines that the G3 state should be entered, effectors 234 associated with each of the components 310-340 may assert one or more control signals that instruct the power-control hardware 228 to turn off all power. In another example, the power-management policy 212 has decided to enter the G2 state; after the OS has saved the context of any currently running programs, an effector 234 instructs the power-control hardware 228 to decrease an available power to the memory 320.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents

What is claimed is:

1. A device, comprising:
   an operating system including a power control policy for a component of the device and an effector program controlling power for the component based on the power control policy; and
   power control hardware controlled by the effector program to implement the power control policy for the component; and
   a configuration utility receiving a method for controlling the power control hardware and generating the effector using the method,
   wherein the configuration utility is executed during a startup procedure of the device and thereafter does not occupy a runtime memory of the device.

2. The device of claim 1, wherein the configuration utility further receives a description of the component and generates the effector using the description.

3. The device of claim 1, wherein the description includes an Advanced Configuration and Power Interface (ACPI) description.

4. The device of claim 1, wherein the configuration utility includes an ACPI Machine Language (AML) interpreter.

5. The device of claim 1, wherein the effector program is a separately executable program.

6. The device of claim 1, wherein the operating system is at least partially loaded onto the device after execution of the configuration utility.

7. The device of claim 1, wherein the component is one of an integral hardware component of the device and an external hardware component electrically coupled to the device.

8. The device of claim 1, wherein the component is one of a processor, a non-volatile memory, a volatile memory, an input/output device and a display.

9. The device of claim 1, further comprising:
   a processor executing the operating system, wherein the processor has less capabilities than a general purpose computer processor.

10. The device of claim 1, further comprising:
    a runtime memory storing the operating system during execution, wherein the runtime memory has less storage space than a general purpose computer memory.

11. The device of claim 1, wherein the power control policy includes a plurality of states for the component.

12. A method, comprising:
    determining, by a configuration utility, a power state for a component;
    executing, by the configuration utility, an effector program to produce a control output corresponding to the power state;
    terminating an execution of the configuration utility;
    loading an operating system, after terminating the execution of theconfiguration utility; and
    controlling power supplied to the component so that the component enters the power state.

13. The method of claim 12, wherein the effector program is a separately executable program.

14. The method of claim 12, further comprising:
    receiving a method for controlling the component; and
    generating the effector program based on the method.

15. The method of claim 14, further comprising:
    receiving a description of the component, the description being used for generating the effector program.

16. The method of claim 12, wherein the power state is a plurality of power states and the effector program is a plurality of effector programs, each of the power states corresponding to one of the plurality of effector programs.

17. The method of claim 12, wherein the component is one of a processor, a non-volatile memory, a volatile memory, an input/output device and a display.

18. A device, comprising:
    a memory storing a set of instructions;
    a processor configured to execute the instructions, the instructions being operable to,
       determine, by a configuration utility, a power state for a component,
       produce, by the configuration utility, a control output corresponding to the power state;
       terminate an execution of the configuration utility; and
       load an operating system, after terminating the execution of the configuration utility; and
    power control hardware receiving the control output and controlling power supplied to the component so that the component enters the power state.

* * * * *

UNITED STATES PATENT AND TRADEMARK OFFICE
CERTIFICATE OF CORRECTION

| | | |
|---|---|---|
| PATENT NO. | : 7,856,550 B2 | Page 1 of 1 |
| APPLICATION NO. | : 11/693042 | |
| DATED | : December 21, 2010 | |
| INVENTOR(S) | : Hutchison | |

It is certified that error appears in the above-identified patent and that said Letters Patent is hereby corrected as shown below:

Claim 12, Column 8, Line 19:
"theconfiguration" should read "the configuration"

Signed and Sealed this
First Day of March, 2011

David J. Kappos
*Director of the United States Patent and Trademark Office*